Figure 1:
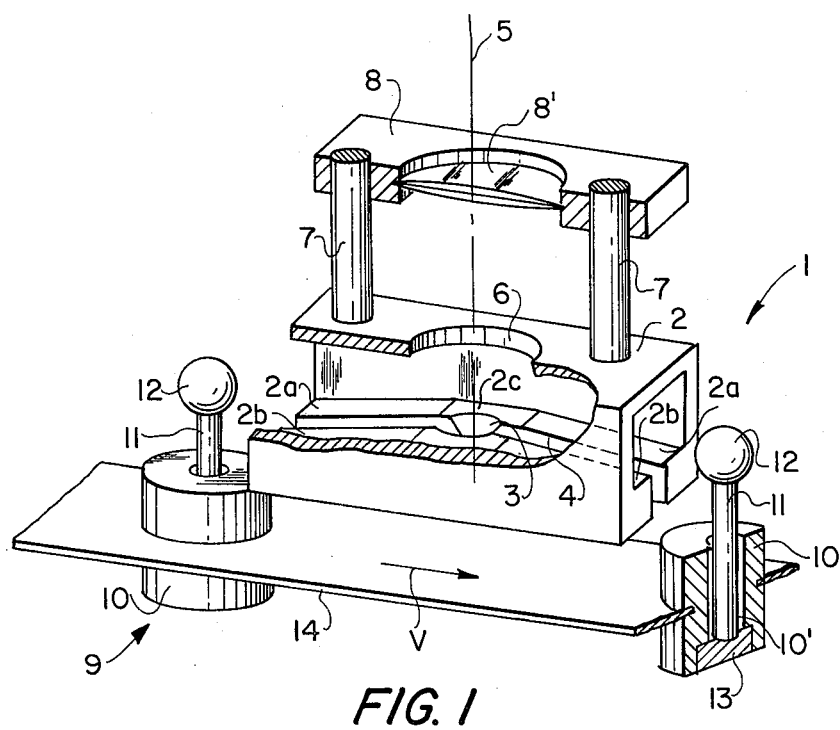

United States Patent [19]

Hepp et al.

[11] 3,913,902
[45] Oct. 21, 1975

[54] CENTERING MEANS FOR PROCESSING SHAFTS HAVING A SPHERICAL SHAFT END

[75] Inventors: Wolfgang Hepp, Immenstaad; Klaus Pimiskern, Friedrichshafen; Werner Herbert, Markdorf, all of Germany

[73] Assignee: Dornier System GmbH, Germany

[22] Filed: June 25, 1973

[21] Appl. No.: 373,259

[30] Foreign Application Priority Data
Aug. 11, 1972 Germany............................ 2239621

[52] U.S. Cl. .................................................. 269/8
[51] Int. Cl.² ......................................... B25B 11/00
[58] Field of Search ........... 33/174, 178, 1 SA, 180; 198/19; 269/8, 321 A, 316

[56] References Cited
UNITED STATES PATENTS
2,785,474 3/1957 Mages.................................. 33/178
3,213,997 10/1965 Fryer..................................... 198/19

Primary Examiner—Richard E. Aegerter
Assistant Examiner—A. Jason Mirabito
Attorney, Agent, or Firm—James E. Bryan

[57] ABSTRACT

This invention relates to a centering device for the processing of shafts having a spherical shaft end comprising a pair of run-up and run-off ramp means having central horizontal portions and a gap between said means, a centering bore bridging the gap in said horizontal portions, and receiving means for said shafts adapted to travel below said gap and having means associated therewith exerting a downward force on said shafts, whereby the spherical shaft ends will travel on the run-up and run-off ramps and be seated in said bore when said receiving means travels below said gap.

4 Claims, 2 Drawing Figures

CENTERING MEANS FOR PROCESSING SHAFTS HAVING A SPHERICAL SHAFT END

The present invention relates to a centering means for the treatment, or for processing, of shafts having a spherical shaft end which are conveyed by means of a rotatable transporting device to a treating or processing device, for example a light exposure device, or a control device, and must be fixed or positioned there exactly concentrically to the center line of the processing means.

A large number of axial pedestal bearings are composed of a shaft with a spherical shaft end, and of a bearing supporting member which includes a spherical segment-like recess or cavity corresponding to the shape of the shaft end. For purposes of producing a supporting lubricating film between the spherical gliding surfaces, spirally-extending shallow grooves or notches are disposed in a manner known per se at the spherical surface of the shaft end. The formation of such oil grooves is customarily effected by the application of a photographic lacquer onto the spherical surface, which lacquer is subsequently exposed with the spirally-shaped pattern of the oil grooves. After developing the exposed spherical surface, the oil grooves at the spherical surface are produced with the aid of known chemical etching processes.

The accuracy of the oil grooves is of particular importance for the operational efficiency and smoothness as well as the useful life of such axial bearings. For this reason, even the exposure of the spherical gliding surface is a determinative factor for the precision of the bearing. During the series production of shafts having spherical shaft ends, the same are received in rotating transporting devices and travel, in a timed or synchronized manner, through the individual treating stations. The exposure device represents in this case a treating station in which not only the object distance, e.g., the distance of the spherical shaft end in the axial direction to the exposure device, but also the concentric position of the sphere with respect to the optical center line of the exposure device are extremely important. This precise position cannot be achieved directly by means of a movable transporting device since an exact control of the advance of the transporting device being carried out in a timed manner could be obtained only with an extraordinarily large structural expenditure.

It is the object of the present invention to accomplish during the series production of spherical shaft ends being provided with a spiral groove pattern a precise positioning of the spherical shaft ends with respect to the exposure device without the advance of the transporting device being carried out in a timed fashion requiring a specific expenditure with respect to a precise coordination to the center treating line, and without requiring a direct manual intervention to be carried out in the sequence of operations.

This object is obtained, in accordance with the present invention, by means of a. a pair of gliding surfaces mounted in a stationary manner and arranged parallel with respect to each other in the advancing or feeding direction, which are separated from each other by a gap being adapted or matched to the shaft diameter, and which are provided in each case as run-up and run-off ramps or slopes, with a common conical centering bore bridging the gap and positioned between the run-up ramp and the run-off ramp portions, and b. receiving devices or means mounted on the transporting device and extending below the gap with bores for the shafts, into which one shaft each is vertically movably insertable with the spherical shaft end thereof directed upwardly against a downwardly acting restoring force in such a manner that, during the advance or feeding movement, the shaft axle or shank is introduced into the gap formed by the pair of gliding surfaces and the spherical shaft end travels on the gliding surfaces.

According to a further embodiment of the present invention, the gliding surfaces are accommodated inside a box-like profile on the underside thereof. As the restoring force, magnetic force is preferably used, and a magnet is positioned at the lower end of the bore in the receiving device for the workpiece.

This stationary arrangement of the centering device or means produces, or results in, the precise position of the workpiece nearly independently of the feeding accuracy of the transporting device with respect to the center treating line. As a result, a uniformly high quality is obtained during the series treatment or processing of the aforementioned workpieces and the scrap ratio as well as the quality variations are greatly reduced. The workpiece remains in the range of influence of the magnetic force of the permanent magnet during the entire sequence of operations so that it is also held in the centering bore.

One embodiment of the centering device or means will now be described in further detail hereinbelow with reference to the accompanying drawing. It is intended that in this centering device or means the photographic exposure of the spherical shaft end with a spiral groove pattern be effected.

Figure 2:
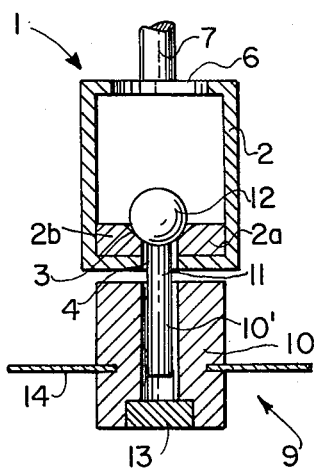

FIG. 1 is a view of the centering device in a simplified form thereof and partially in cross-section, and FIG. 2 is a cross-sectional view of the centering device.

Illustrated in the drawing is a stationary centering device or means 1. The significant part thereof is composed of a box-like profile 2 whose lower wall has a longitudinal slot 4. The width of this continuous slot 4 is so selected that the shaft 11 of the workpiece can be passed therethrough without difficulty. The lower wall of the box-like profile 2 is beveled, pieces 2a and 2b are inserted on both sides of the slot 4, each of which have a flat run-up and run-off ramp as gliding surfaces. In the horizontal center part 2c of the insert or distance pieces 2a and 2b a conical centering bore 3 is positioned centrally of the slot 4. Provided in the upper wall of the box-like profile 2 is a passage bore 6 for the projection beam. The mounting 8 for the projection lens 8' is connected by way of cloumns 7 with the box-like profile 2. The centering bore 3, the passage bore 6, and the projection lens 8' are positioned in an aligned fashion in the optical axis 5 shown in dash-dotted lines.

The transporting device 9 is composed here, for example, of a conveyor belt 14 with a receiving device 10 for the workpiece. The workpiece itself is composed of a shaft 11 having a spherical shaft end 12. The shaft 11 sits loosely within a bore 10' of the receiving device 10. A permanent magnet 13 in the lower part of the receiving device 10 retains the workpiece in position. The direction of the feed or advance of the transporting device 9 is indicated by the arrow V.

Due to the advance of the transporting device 9 which takes place in a timed manner, the shaft 11 is introduced into the slot 4, and the spherical shaft end 12 glides on the upwardly-running gliding surfaces 2a and 2b to the conical centering bore 3, and is there caused by the attractive force of the permanent magnet 13 to faultlessly make contact with or rest against the conical centering bore surface. The advance of the transporting device 9 is so controlled that the center of the receiving device 10 is brought to a standstill near the optical axis 5. By virtue of a slight play between the diameter of the shaft 11 and the bore 10' of the receiving device 10, the feeding accuracy of the transporting device to the center of the centering bore 3 is compensated for so that the workpiece will be located in the stationary centering bore 1 and is fixed within the centering bore by the magnetic force. The gravitational force alone is not sufficient for purposes of a fixation in many cases. After this centering operation begins the treating phase proper of the spherical shaft end 12, such as exposure to light of the spherical surface, is effected. When the treating phase has been completed, the spherical shaft end 12 is pressed out of the centering bore 3 during the next advancing or feeding step of the transporting device 9 and returned, via the running-off gliding surfaces 2a and 2b, and biased by the attractive force of the permanent magnet 13, to the bottom of the receiving device 10.

Outside of the centering device 1, the shaft 11 makes direct contact with, or lies directly on, the surface of the permanent magnet 13 and is thus held in the vertical direction. It is also possible to use restoring forces other than magnetic force for the centering of the workpiece, for example an elastic force. Furthermore, other transporting devices also may be employed instead without difficulty, such as for example rotary tables at the circumference of which the receiving devices for the workpieces are arranged.

It will be obvious to those skilled in the art that many modifications may be made within the scope of the present invention without departing from the spirit thereof, and the invention includes all such modifications.

What is claimed is:

1. A centering device for the processing of shafts having a spherical shaft end comprising a pair of parallel run-up and run-off ramp means forming sliding surfaces and having central horizontal portions and a gap between said means, a centering bore bridging the gap in said horizontal portions, and receiving means for said shafts adapted to travel below and in alignment with said gap and having means associated therewith exerting a downward force on said shafts, said spherical shaft ends traveling on the run-up and run-off ramp means and being seated in said bore as said receiving means travels below said gap.

2. A centering device according to claim 1 having a box-like configuration with said run-up and run-off ramp means forming the interior bottom thereof.

3. A centering device according to claim 2 including aperture means in the top of said box-like configuration above said centering bore.

4. A centering device according to claim 1 in which the means exerting a downward force on said shafts is magnet means.

* * * * *